United States Patent [19]
Chambers et al.

[11] Patent Number: 5,970,023
[45] Date of Patent: Oct. 19, 1999

[54] REDUCING ALIASING ARTIFACTS IN SEISMIC DATA PROCESSING USING SHARPENED (TAU-P-Q) TRANSFORMS

[75] Inventors: Ronald E. Chambers, Houston; Necati Gulunay, Missouri City, both of Tex.

[73] Assignee: Baker Hughes Incorporated, Houston, Tex.

[21] Appl. No.: 09/253,617

[22] Filed: Feb. 19, 1999

[51] Int. Cl.$^6$ ............................... G01V 1/36; G01V 1/00
[52] U.S. Cl. ................... 367/63; 367/46; 367/49; 367/52; 367/63
[58] Field of Search .................. 367/46, 49, 52, 367/63, 43, 73, 74

[56] References Cited

U.S. PATENT DOCUMENTS

| | | | |
|---|---|---|---|
| 4,628,492 | 12/1986 | Winney | 367/63 |
| 4,760,563 | 7/1988 | Beylkin | 367/73 |
| 5,719,822 | 2/1998 | Wang | 367/53 |

OTHER PUBLICATIONS

Linear and Parabolic τ–p Transforms Revisited; Binzhong Zhou and Stewart A. Greenhalgh; Geophysics, vol. 59, No. 7 (Jul. 1994); p. 1133–1149, 7 FIGS., 1 Table.

Binzhong Zhou and Stewart A. Greenhalgh (Linear and parabolic t–p transforms revisited) pp. 1133–1149.

*Primary Examiner*—John Barlow
*Assistant Examiner*—Anthony Jolly
*Attorney, Agent, or Firm*—J. Albert Riddle

[57] ABSTRACT

Marine seismic data sets are generally under-sampled spatially because of the relatively long listening times required in deep water. It is customary to use very long spreads in the field thereby enhancing aliasing and interference from coherent noise. A seismic-signal data processing method is proposed that applies a combination of a forward parabolic Radon transform and a linear Radon transform to the data, followed by a further transform to a three-dimensional frequency domain. In this domain, a deterministic operator is applied to the data to sharpen the Radon-domain response thereof. The data are then scavenged of noise in the Radon domain and inversely transformed back into the time-space domain.

5 Claims, 8 Drawing Sheets

$p \equiv \dfrac{\partial t}{\partial(y)}$   $q \equiv \dfrac{\partial t}{\partial(x^2)}$

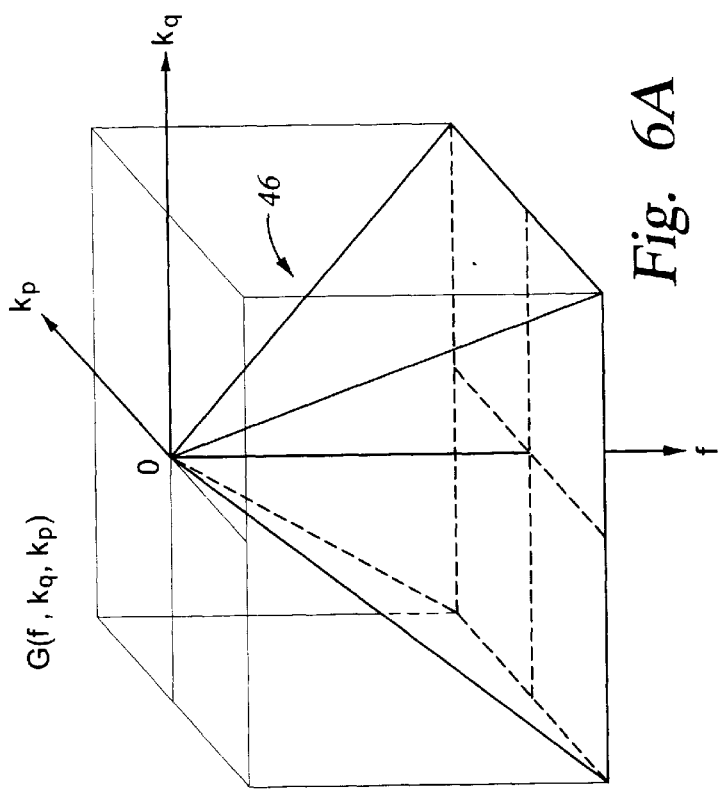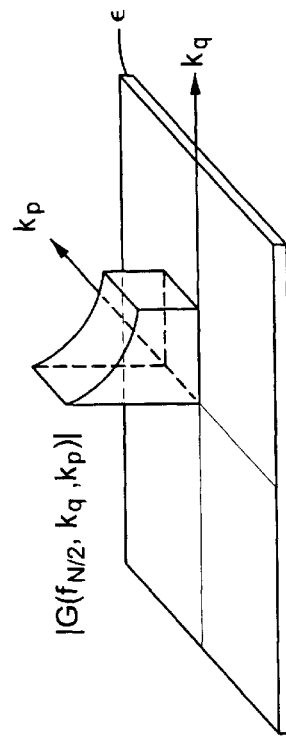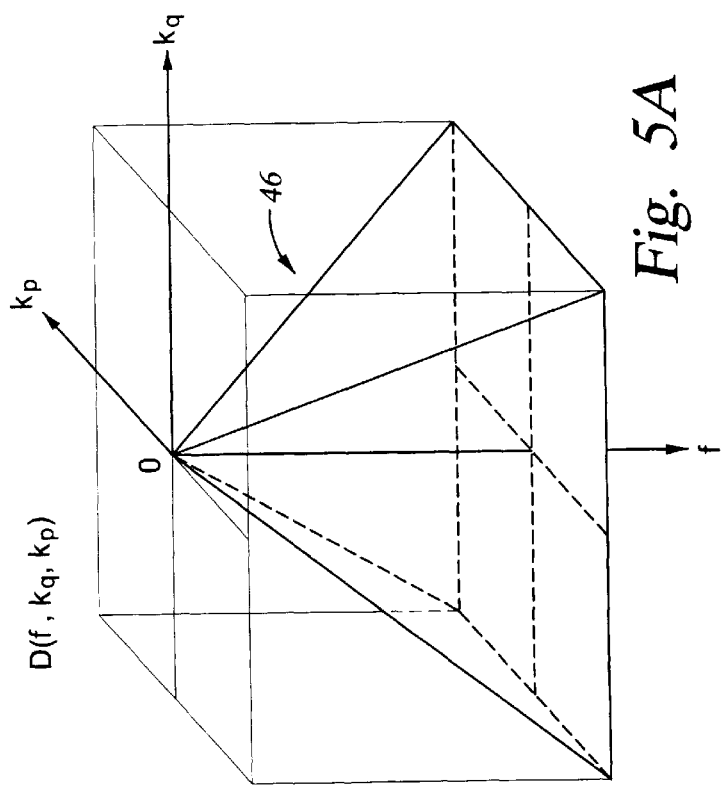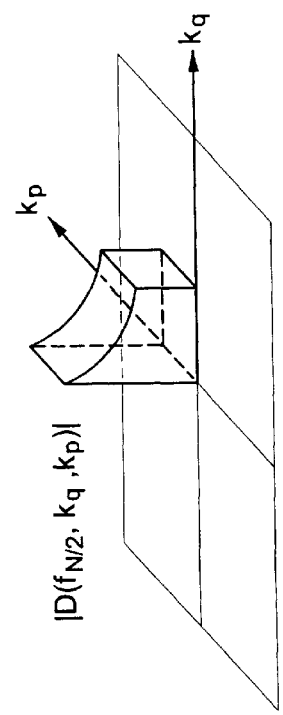

REDUCING ALIASING ARTIFACTS IN SEISMIC DATA PROCESSING USING SHARPENED (TAU-P-Q) TRANSFORMS

BACKGROUND OF THE INVENTION

1. Field of the Invention

This is a method of avoiding aliasing artifacts in the processing of CMP seismic data originating from arrays characterized by large source-receiver distances. The method is particularly useful in deep-water marine operations where the CMP gathers are made of sparsely-recorded traces.

2. Discussion of Related Art

The art of seismic exploration for natural resources is very well known. Nevertheless, a brief tutorial follows.

An acoustic source of any well-known type is caused to radiate a wavefield (fire a shot) into a body of water from a source location at or near the surface. The wavefield may be radiated by an impulsive device such as air gun, by a chirp-signal generator or by an implosive device. The acoustic radiator may be a single point-source or an array of point sources arranged in a desired pattern. Hereinafter for brevity, we will simply use the term "source".

The radiated wavefield propagates in all directions, insonifying the subsurface earth layers whence the wavefield is reflected back to the surface of the earth where the reflected wavefield is detected by an array or spread of acoustic receivers. The acoustic receivers may be of any type having a capability for converting mechanical compressional waves to electrical signals. Suitable receivers for deep water marine use include pressure sensors (hydrophones) that are responsive to stimuli from one or more spatial directions. The term "receiver" includes a single instrument or a group of several electrically-interconnected receivers arranged in a desired geometric pattern at or near the surface of the earth.

The electrical signals from the receiver(s) are delivered through data transmission means to data-conditioning and archival storage channels, one channel per receiver. The data transmission means may be electrical-wireline, optical, or ethereal in nature. Acoustic data-transmission channels are also known.

The electrical signals representative of the arrival times of reflected wavefields at the respective receivers are digitized and recorded on reproducible, computer-readable recording media such as, but not limited to, photographic time scale recordings, magnetic tapes, floppy disks, CD-ROMs or any other data-recording medium now known or as yet unknown.

The recorded data are later delivered to a processing center where the data are fed to a suitable general purpose computer of any desired type which is programmed to convert the seismic data to a visual model of the earth's subsurface. Programs in the computer include formulations and algorithms that exist for the sole purpose of operating on the digitized seismic data signals to convert those signals into a different state such as the desired visual model of a volume of the earth. The resulting model is used by geologists in recovering valuable natural resources such as oil, gas or other useful minerals for the benefit of humankind. That is, data processing algorithms exist to process the gathered seismic signals into a useful, human-interpretable format; the data are not gathered simply to provide a solution to some naked algorithm.

Geophysical surveys may be one- or multi-dimensional. In a two-dimensional survey by way of example but not by way of limitation, a source and an array including a plurality, numbering in the hundreds or perhaps thousands, of spaced-apart receivers are emplaced along a line of survey, one receiver or receiver group per data channel. The receivers, preferably separated from one another by an interval such as 25 meters, are distributed along the line of survey at increasingly greater offset distances from the source. The range in offsets may extend from about 200 meters from a source to the nearest receiver to as much as 30 kilometers or more to the most distant receiver.

With particular reference to marine exploration in deep water, a ship continuously tows a long cable containing the receivers through the water along the line of survey. A ship-borne source is fired periodically at selected time intervals followed by a listening period during which the receivers detect the returning reflected seismic wavefields. Typically the ship travels about 6 knots (about 11 km/hr). Two-way wavefield travel times of 15 seconds or more to deep earth layers are routine. Therefore, the interval between successive source firings must exceed the listening time by a comfortable margin. At the usual ship velocity of 6 knots therefore, the spatial separation between source-firing locations may be about four times the receiver spacing or about 100 meters.

FIG. 1 is a schematic drawing showing a receiver array, 8, of indefinite length, of which the first 20 receivers, represented as small circles $12_0$–$12_{20}$, are shown. The array is towed from left to right by a ship (not shown) and at selected intervals a source is fired at timed intervals at successive, spaced-apart source locations, shown as small inverted triangles $10_0$–$10_4$, as the spread progressively moves down the line of survey 13. As explained above the separation between a source and a receiver is the offset x.

A common mid point, such as 14, positioned on stratum 16 is acoustically illuminated by wavefields emanating from different source locations and received at different receiver locations. The first wavefield trajectory is 18, source location $10_0$, to receiver $12_{12}$. The next trajectory, 20, is $10_1$–$12_{16}$ and the third trajectory, 22, is $10_2$–$12_{20}$. CMP 14 is formed by summing (stacking) the three trajectories after application of the appropriate hyperbolic normal moveout to each one. Additional CMPs are generated similarly such as but not limited to CMPs 24 and 26. A three-input CMP is shown for simplicity but should not be taken as limiting. In seismic data processing, it is commonplace to achieve redundancy by CMP stacking as shown above in the time-space (t-x) domain for the purpose of canceling undesired random and coherent noise such as multiple energy. Certain types of undesired noise often only can be separated from the desired signal by transforming the data to some other domain such as the frequency-wavenumber (f-k) domain or slant stacking in tau-p ($\tau$-p) space.

To avoid spatial aliasing problems it is required to have two or more samples per wavelength. But because of the lengthy listening time demanded by deep-water operations and the resulting wide separation between source locations, the in-line direction is sparsely sampled such that a single CMP in (t-x) space includes but 25% of the traces recorded per spread of each single shot as shown in FIG. 1. Temporal or spatial aliasing artifacts result which blocks the effective elimination of undesired energy such as multiples, severely distorting the desired model of the subsurface.

Winney, in U.S. Pat. No. 4,628,492, issued Dec. 9, 1986 recognized the aliasing problem in the slant stacking of seismic data. He provides a method for avoiding aliasing in $\tau$-p transforms of seismic data which features identification of frequency components of the data likely to be aliased during the correlative summation steps, which components he then throws away. His method involves loss of valuable data. G. Beylkin in U.S. Pat. No. 4,760,563, issued Jul. 26, 1988, discloses a method and system for discrete transformation of measurements such as seismic data into and out of τ-p space which is both exact and practical in terms of processing time. The measurements can be filtered or otherwise processed in tau-p space in ways that are not practical or possible in their original space. Since the transforms into and out of tau-p space are exact, the filtered and transformed measurements are free of errors and distortions that perturb known approximate transforms which can be performed in a reasonable time. When the transformation process is carried out in frequency space it is done frequency-to-frequency, and when it is carried out in the spatial domain it can utilize a transformation matrix having a block circulant structure. In each case, the transformation process and matrix have a structure which substantially reduces storage and processing requirements as compared to known art. In real life, however, the Beylkin process turns out to be too excessively complex for routine use. Furthermore, Beyklin's method works with a single CMP at a time and therefore cannot address aliasing issues effectively.

The '563 patent is of interest because it presents a voluminous exegesis of the seismic data-processing art with respect to forward and inverse transforms between (t-x) space and the (f-k), (τ-p) domains. It is incorporated herein by reference for its tutorial content.

There is a need for an efficient method of processing deep-water seismic data which will provide the resolution to clearly separate undesired noise from desired signals without introducing spatial or temporal aliasing effects. It is proposed to provide a sharpening operator for improving the resolution of a CMP stack.

SUMMARY OF THE INVENTION

The present process involves the provision of a data set composed of consecutive CMP gathers of seismic data signals discretely recorded in t-x space and corrected for hyperbolic moveout. The method contemplates executing a parabolic Radon transformation, embracing a predetermined moveout window of said data set in the x coordinate and then executing a linear Radon transformation encompassing a predetermined dip window in the y coordinate across CMP gathers to form a forward-transformed Radon gather, $D(\tau, p, q)$. The gather, $D(\tau, p, q)$ is transformed from the (τ-p-q) domain to the frequency domain to define the spectral data response, $D(f, k_p, k_q)$. A zero-dip, zero-moveout normalizing function, $G(f, k_p, k_q)$ is defined for a flat model built with the geometry characteristic of the original data set. The spectral data response is deconvolved by multiplication $D(f, k_p, k_q)$ by $|1/G(f, k_p, k_q)|$. Thereafter, the product is transformed from the frequency domain to the (τ-p-q) domain as an improved-resolution Radon gather $s(\tau, p, q)$. Undesired noise may now be effectively scavenged from $s(\tau, p, q)$. The residue is inversely transformed from the (τ-p-q) domain to the (t-x-y) domain to recover a substantially noise-free, unaliased data set S(t,x,y).

Prior to the multiplication step a preferred threshold value ϵ is established for zero-dip normalizing function $|G(f, k_p, k_q)|$. The spectral data response) $D(f, k_p, k_q)$ is multiplied by 1/ϵ when $|G(f, k_p, k_q)| < \epsilon$ but by $|1/G(f, k_p, k_q)|$ otherwise.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 5A shows the response of D(τ,p,q) transformed to the frequency domain as $D(f, k_p, k_q)$;

FIG. 5B is a 3-dimensional model of the absolute-value function, $|D(f, k_p, k_q)|$ shown at f=½ Nyquist;

FIG. 6A shows the response of G(τ,p,q) transformed to the frequency domain as $G(f, k_p, k_q)$;

FIG. 6B is a 3-dimensional model of the normalizing function $|G(f, k_p, k_q)|$ including threshold value ϵ, shown for f=½ Nyquist;

Figure 8:
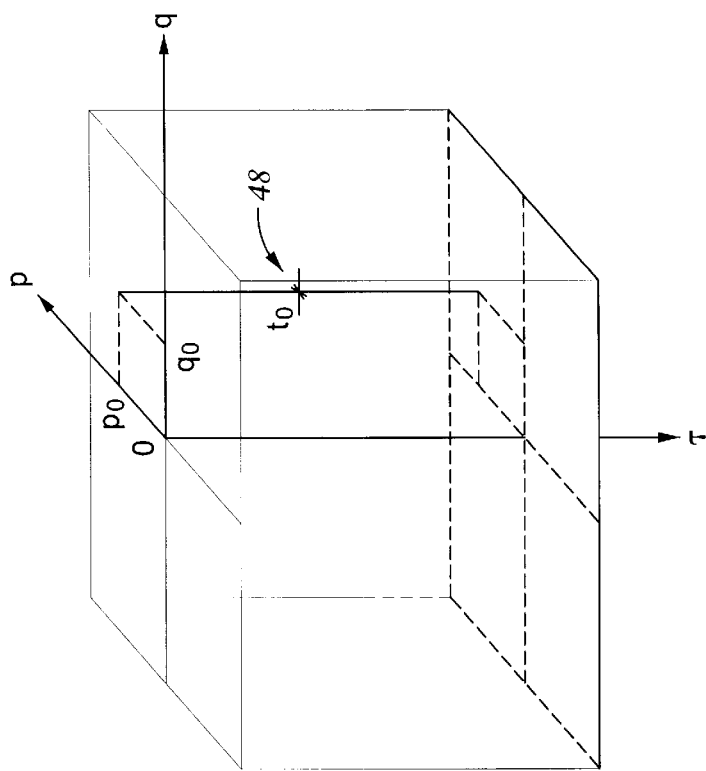
Figure 9A:
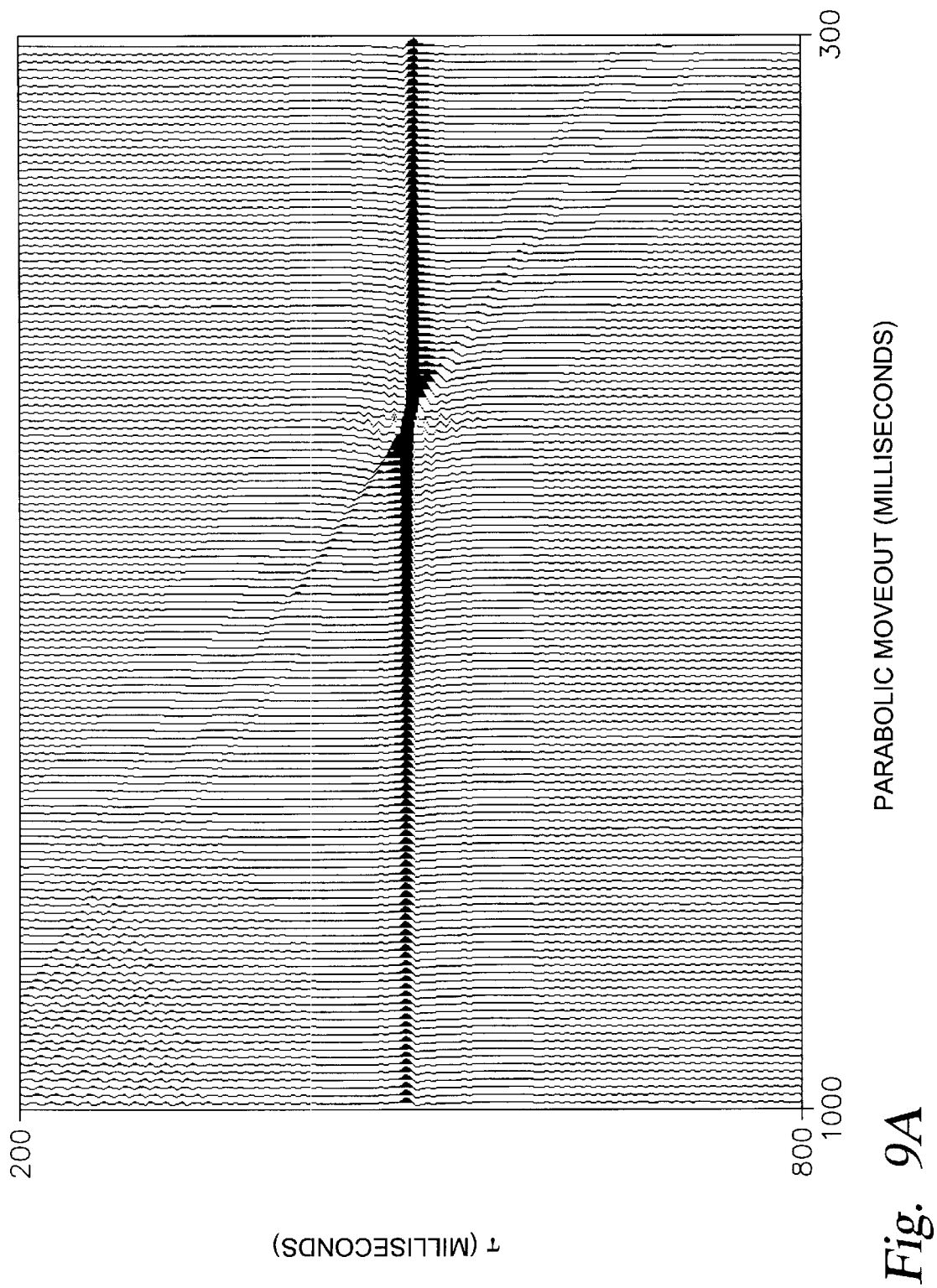
Figure 9B:
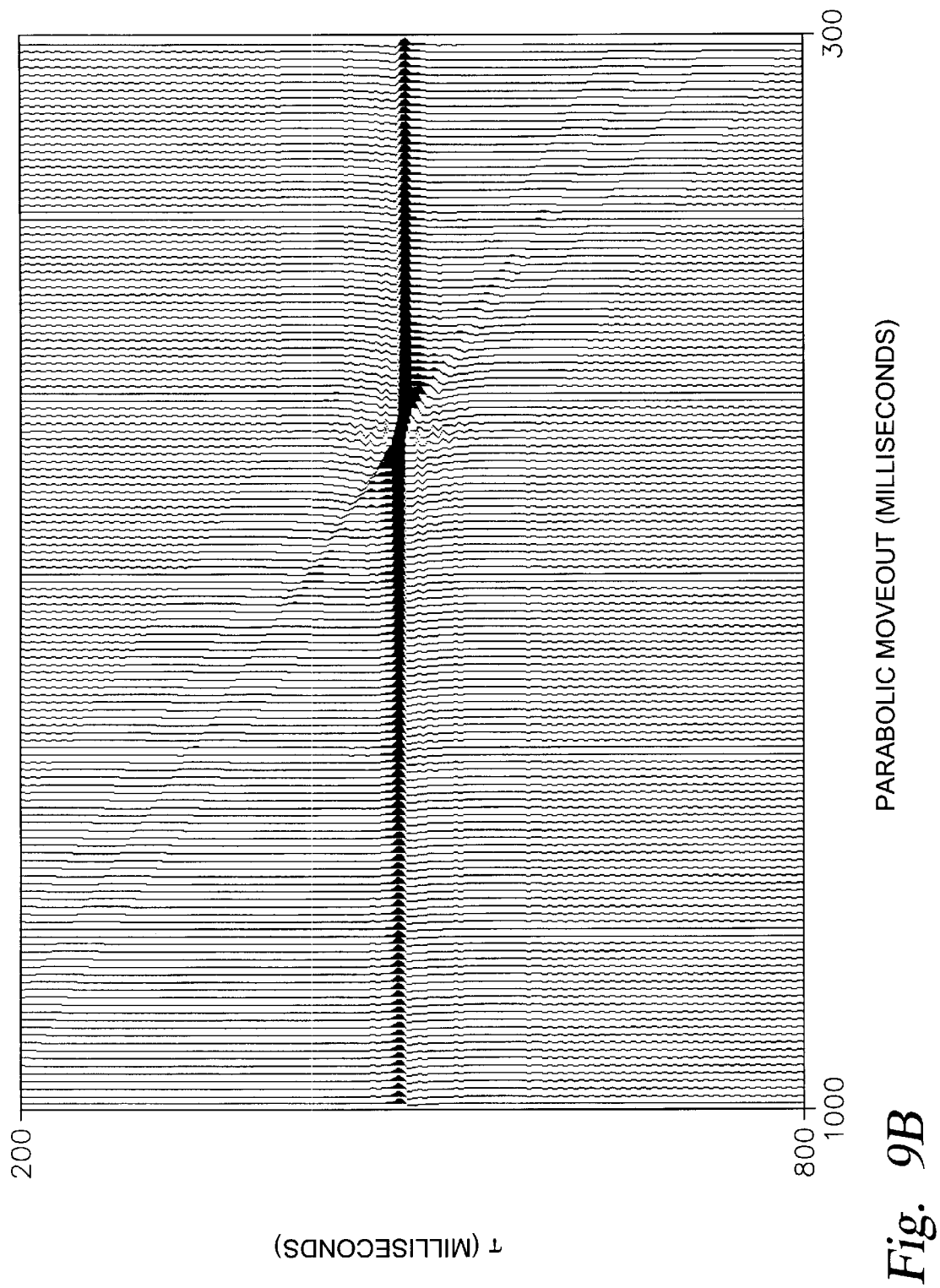
Figure 9C:
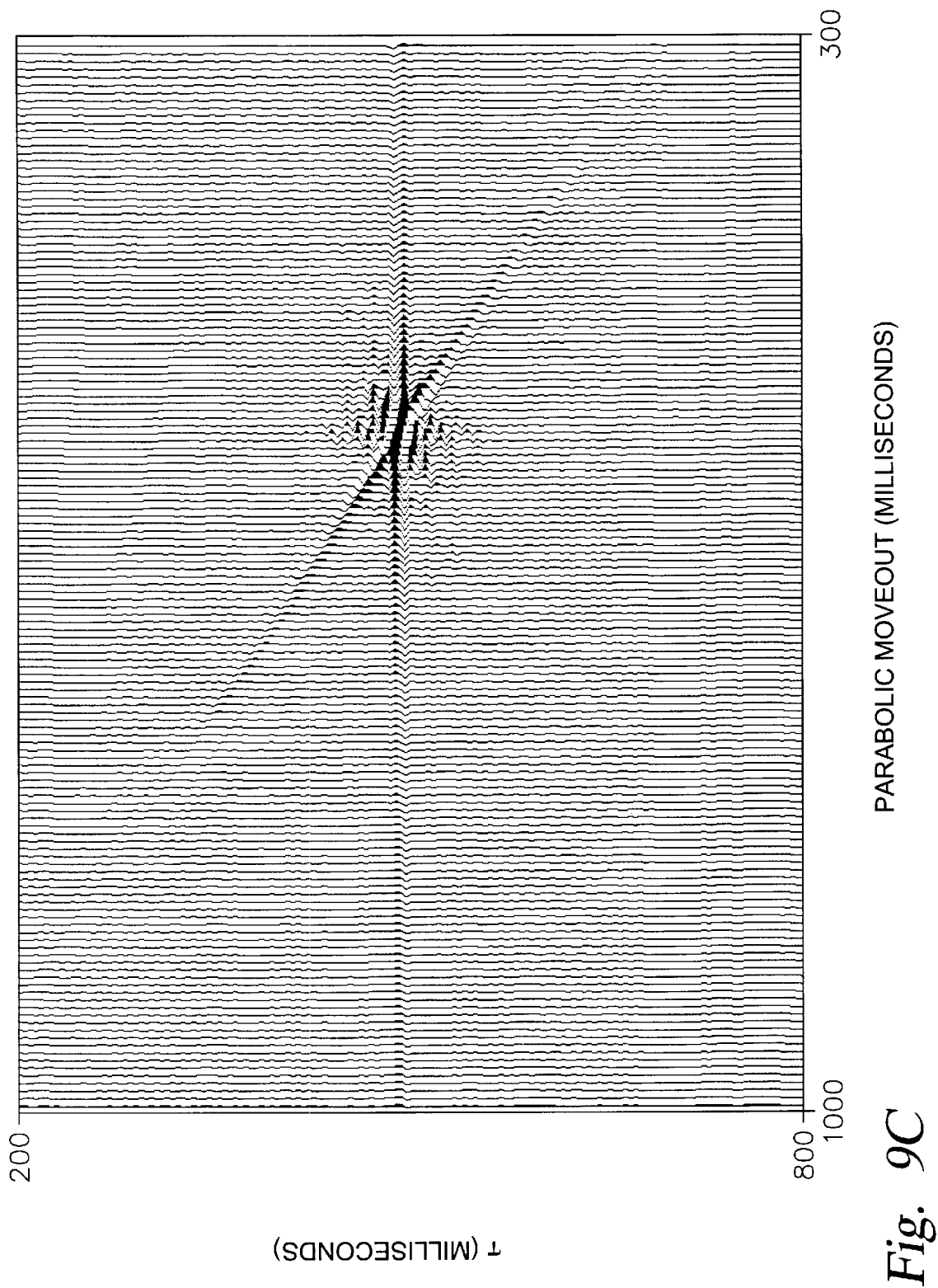

or
D $(f, k_p, k_q)/\epsilon$;

FIG. 8 is the inverse transform of $D(f, k_p, k_q)$ from the frequency domain to the Radon (τ,p,q) domain;

FIG. 9A is the tau-q transform for the first CMP;

FIG. 9B is a 2-dimensional slice of the tau-q-p transform of 8 consecutive CMPs; and FIG. 9C is a 2-dimensional slice of the deconvolved tau-q-p transform for 8 consecutive CMPs.

DETAILED DESCRIPTION OF THE PREFERRED EMBODIMENT

Figure 1:
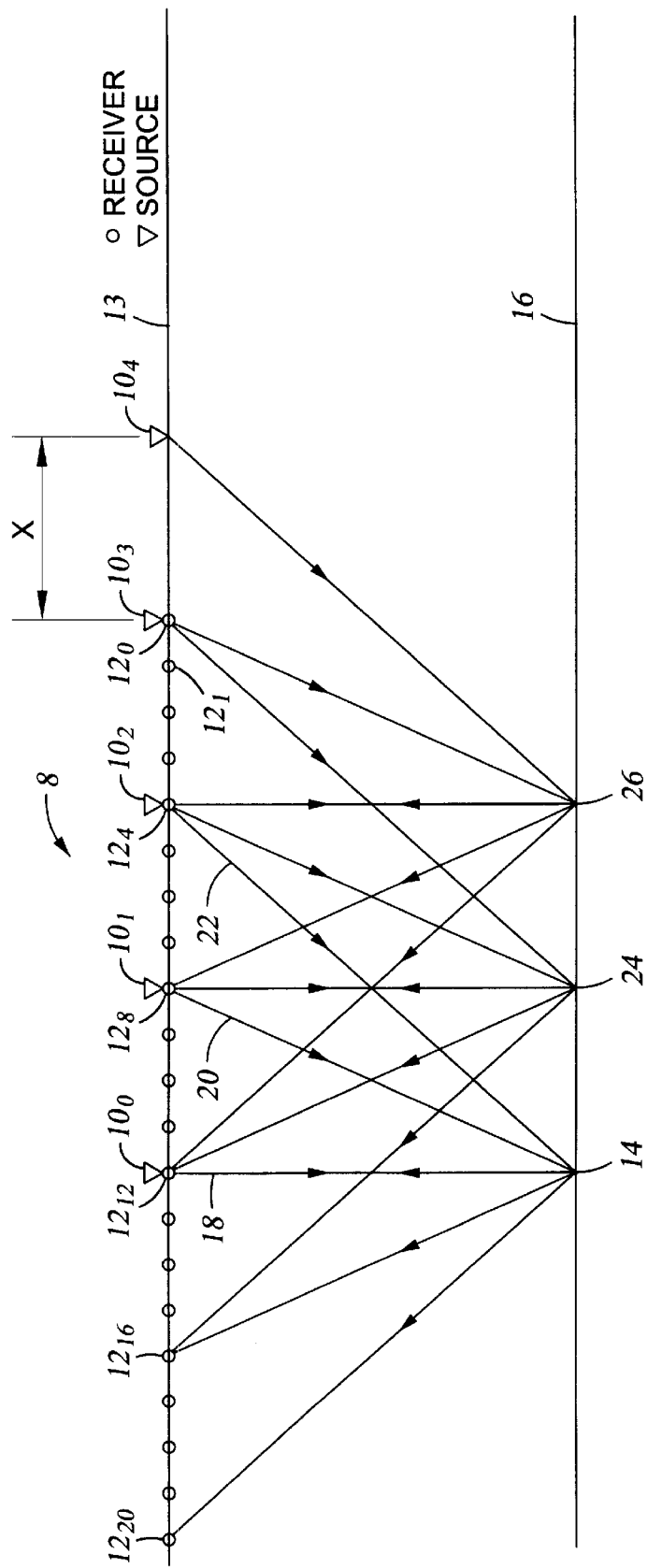
FIG. 1 is a schematic drawing showing the geometry of CMP gathers.

The initial data are chosen by selecting a set of two-dimensional, consecutive CMP gathers, such as eight, distributed along a line of survey. As earlier explained in connection with FIG. 1, a single CMP may often be missing many offsets relative to a full shot. For example, the data may include only 25% of the traces recorded per single spread of each shot. Spatial aliasing may occur when events in the CMP have a large range of moveouts and the intertrace distance within the CMP is coarse. The problem of aliasing could be reduced if the respective neighboring CMPs of a set were to be merged or interfingered in a manner to fill in the missing offsets. It is proposed to process neighboring CMPs together with a single sharpening operator designed from all of the CMPs.

Figure 2:
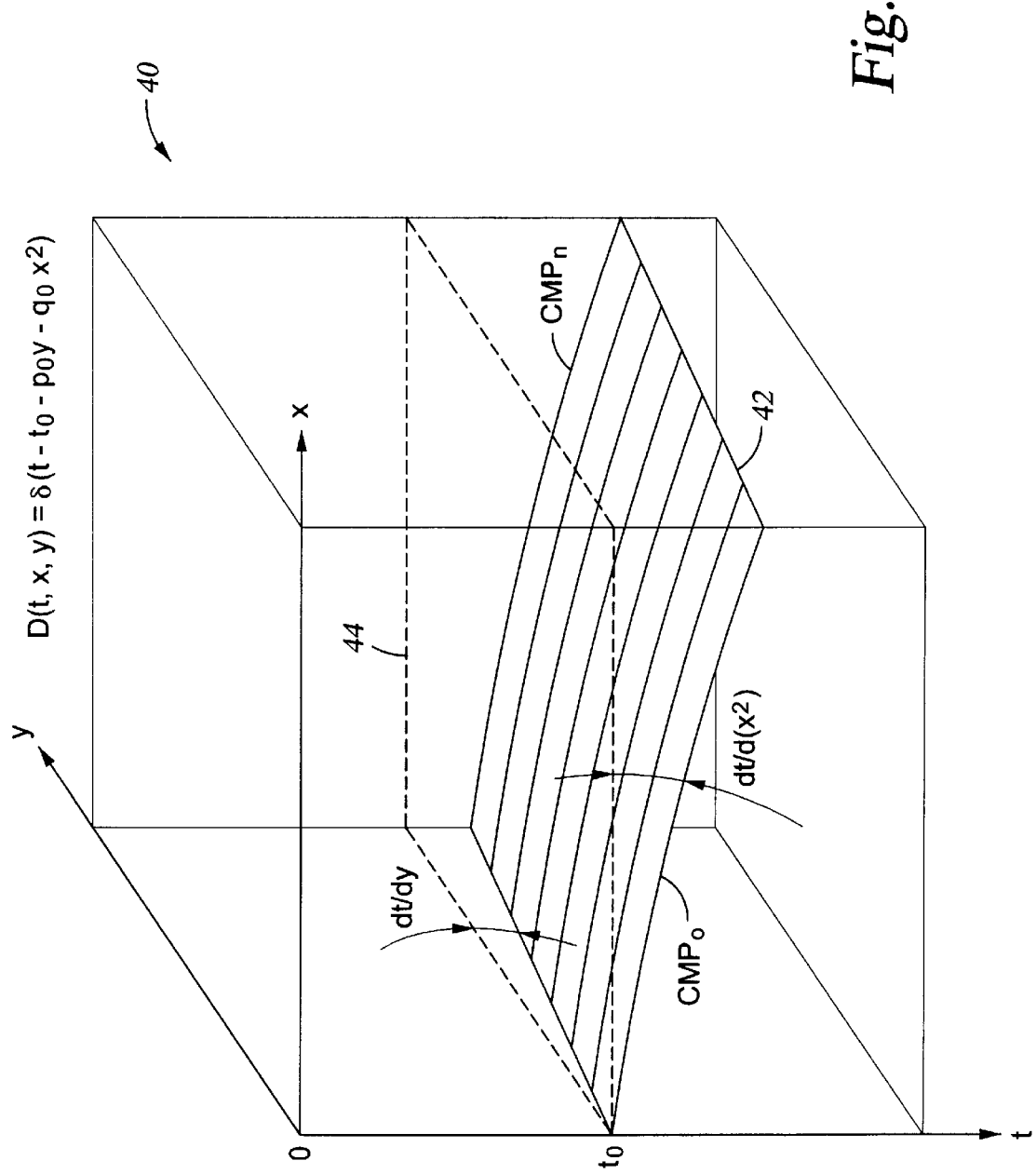
FIG. 2 is a volumetric representation of a data-set containing a single parabolic dipping event, D(t,x,y), in (t,x,y) space.

FIG. 2 shows a volume of the earth model generally shown as 40, represented in the time-space domain having coordinates x, y, t. A dipping stratum, 42, expressed in t-x-y space as D(t,x,y) having an origin at its SW corner at to, dips toward the NE relative to a flat plane 44, $G(t_0,x,y)$. The set of eight sub-parallel curved lines such as $CMP_o-CMP_n$, where n+1=8 is the total number of CMPs to be included in the sharpening operator, represent a set of eight consecutive CMPs, corrected for conventional hyperbolic moveout. More or fewer CMPs could of course be selected.

To combine the CMPs, it is first necessary to adjust the data for residual moveout and for reflector dip. Although the data are gathered using two-dimensional geometry, the adjustment process can be conceptualized as a three-dimensional problem wherein the slope along the x-axis, $dt/dx^2$, is parabolic, expressed, for example as milliseconds per meter$^2$. The dip is linear along a y axis (across CMPs), and is expressed, for example, as milliseconds per CMP.

Figure 3:
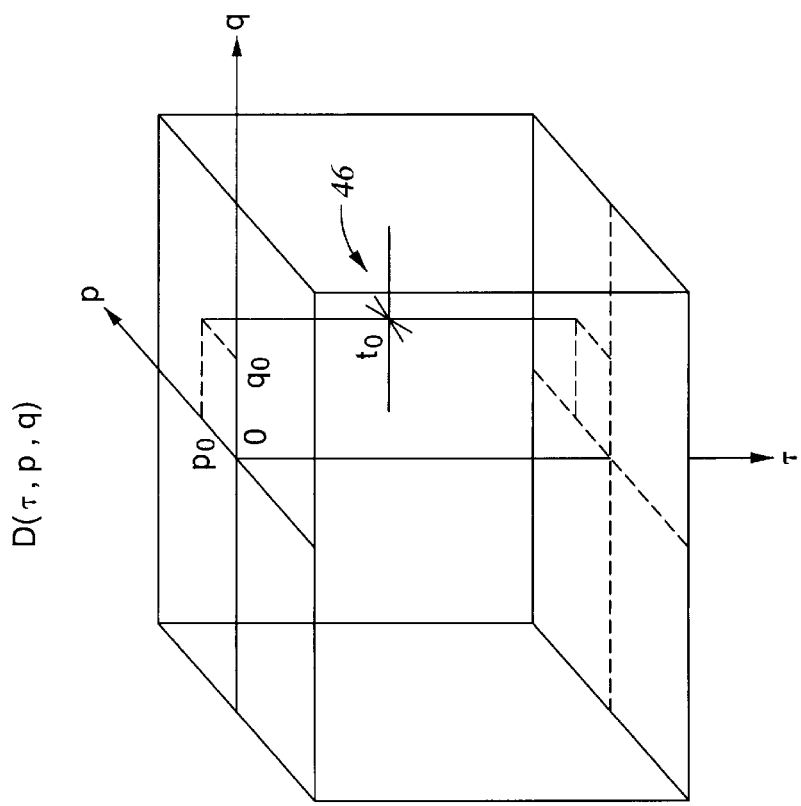
FIG. 3 represents the data set of FIG. 2 forward-transformed into (τ,p,q) space to show the local data response characteristics D(τ,p,q)

Referring to FIG. 3, D(t,x,y) is transformed to the tau-p-q domain by executing the parabolic Radon transforms for each CMP followed by linear Radon transform across CMPs. Note that $p \equiv \partial t/\partial y$ and $q \equiv \partial t/\partial(x^2)$. The moveout window might extend from −100 milliseconds (ms) to as much as +1100 ms at 4-ms increments assuming the data were discretely recorded at 4-ms sample intervals. The window limits are selected based upon experience in the region in view of typical source-receiver offsets in combination with the velocity function characteristic of the regional geology. Similarly the dip window might include a range of dips such as −25<0<+25 ms/CMP at increments of 0.5 ms/CMP for a group of eight CMPs discretely recorded as above at 4-ms sample intervals. The result is a three-dimensional forward-transformed data response cube D(τ-p-q) of FIG. 3.

The blurred system response due to finite aperture along the x and y directions is indicated at 46 in FIG. 3.

Figure 4:
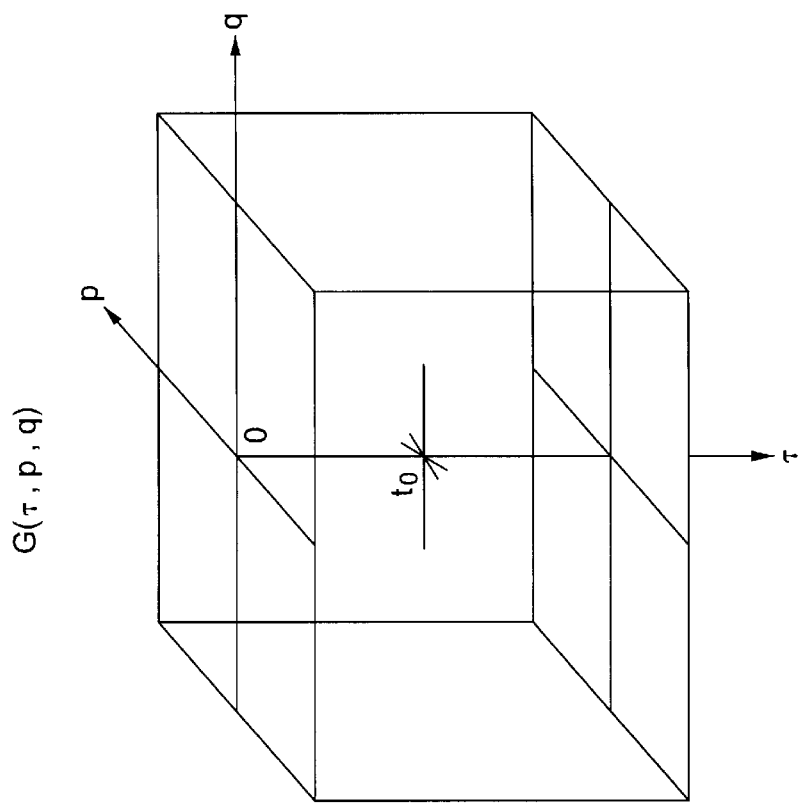
FIG. 4 represents the zero-dip, zero-moveout normalizing function $|G(\tau,p,q)|$ for a model flat event.

To design the desired data-sharpening filter, the 3-D tau-p-q transform is applied to a model flat event, such as reference plane 44 of FIG. 2, built with the same geometry as that of the data. The residual moveout ranges of each transform are kept reasonably symmetrical such as ±400 milliseconds at 4-ms increment and ±17-ms/CMP at 0.5-ms/CMP increment. The transform becomes G(τ,p,q), FIG. 4.

Transform D(τ,p,q) is next Fourier-transformed to the frequency domain as three-dimensional transform shown as the spectral data response cube $D(f,k_p,k_q)$ of FIG. 5A. The frequency/wavenumber response is indicated by the inverted pyramid. The absolute value of the resulting three-dimensional function, $|D(f,k_p,k_q)|$ is shown in FIG. 5B for half Nyquist frequency.

A similar analysis results in the 3-D spectral response cube for $G(f,k_p,k_q)$, FIG. 6A and the absolute value of the zero-dip, zero-moveout normalizing function, $|G(f,k_p,k_q)|$, shown in FIG. 6B for f=½ Nyquist.

It is now desired to design a sharpening operator to flatten the $k_p,k_q$ response of the data and to improve the resolution. Assume that the Radon transform data response D(τ,p,q) is the convolution of a desired spike-like delta function with the actual system response, blurred by side lobes, due to a finite offsets and a finite number of CMPs used in the transform. As is well known, convolution in the (τ,p,q) domain is multiplication in the frequency domain $(f,k_p,k_q)$.

Figure 7A:
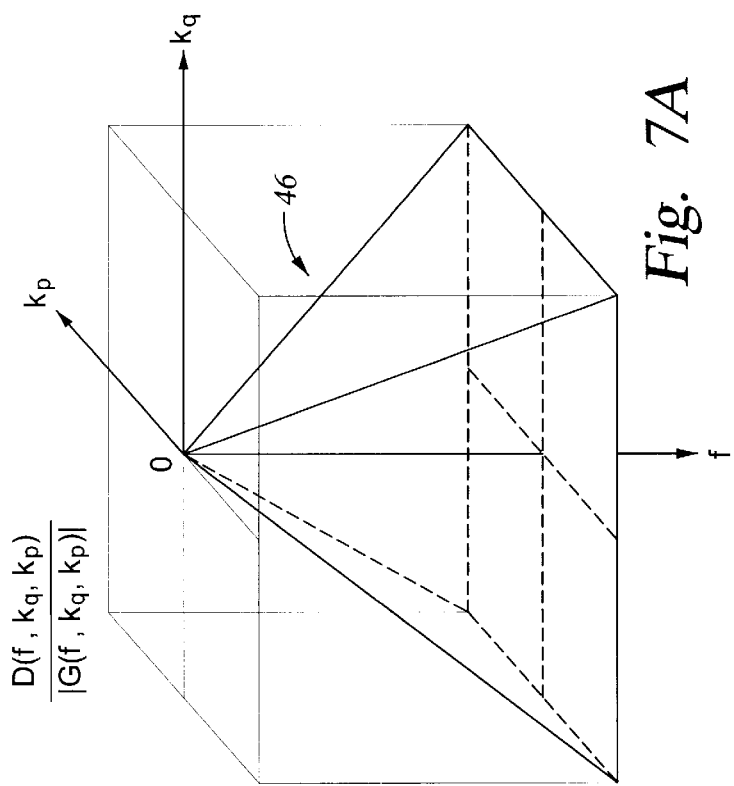
FIG. 7A shows the response characteristics of the function $$\frac{D(f, k_p, k_q)}{|G(f, k_p, k_q)|}$$
Figure 7B:
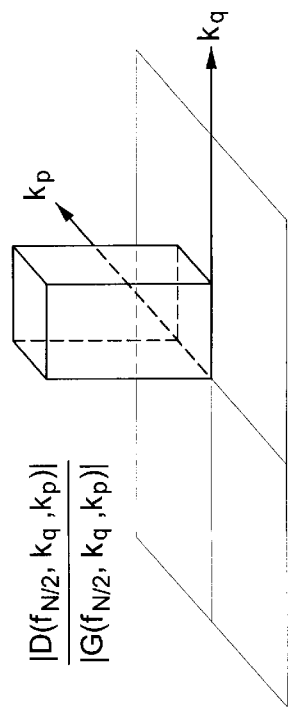
FIG. 7B is a 3-dimensional model of the τ-p-q outputs $$\frac{D(f, k_p, k_q)}{|G(f, k_p, k_q)|}$$

A sharpened output can be constructed as shown by FIGS. 7A and 7B. Referring first to FIG. 7A, the spectral data response $D(f,k_p,k_q)$ is divided by the zero-dip normalizing function $|G(f,k_p,k_q)|$ to provide the response of a sharpened output $\Delta(f,k_p,k_q)$.

Referring now to FIG. 6B to avoid dividing by zero or by small numbers, a fraction, such as 0.01, of the peak value of $|G(f,k_p,k_q)|$ is established as a threshold value, ε:

$$\epsilon = 0.01 \ [\max \ \{|G(f,k_p,k_q)|\}].$$

The reciprocal of the zero-dip normalizing function is then $|1/G(f,k_p,k_q)|$ if its magnitude is larger than ε. Otherwise it is set to 1/ε. The spectral response of the output is the product of the spectral data response and the inverse of the zero-dip normalizing function:

$$\Delta(f,k_p,k_q)=D(f,k_p,k_q) \times |1/G(f,k_p,k_q)|$$

when $G(f,k_p,k_q)>\epsilon$, but $$\Delta(f,k_p,k_q)=D(f,k_p,k_q) \times (1/\epsilon)$$

otherwise.

The product, $\Delta(f,k_p,k_q)$ is inversely transformed from the frequency domain to the (τ,p,q) domain to achieve the desired sharpened data response, s(τ,p,q).

The next three Figures show the effects of our process on a synthetic seismic data set. The horizontal axis is parabolic moveout in milliseconds by trace number. The vertical axis is τ in milliseconds.

FIG. 9A is a 2-dimensional slice illustrating a tau-q transform of the first CMP of FIG. 2 parallel the x axis. The horizontal artifact is due to truncation at inner offsets. The sloping artifact is due to truncation effects at far trace offsets. Faint lineaments in the upper left hand corner are due to aliasing because of coarse sampling between traces.

FIG. 9B is a 2-dimensional slice (p=constant) of the tau-q-p transform for 8 consecutive CMPs of FIG. 3, sliced through the intersection, 46, at $p_0,q_0,t_0$. The glare due to truncation effects is present as in FIG. 9A but the lineaments due to aliasing are not present.

FIG. 9C shows a 2-dimensional section for constant p parallel corresponding to FIG. 9B but after deconvolution. The response, corresponding to a slice through intersection 48, FIG. 8, has been sharpened by substantially reducing the glare, due to truncation effects, shown on FIG. 9B.

At this point noise-scavenging techniques of any well-known type may be applied. Thereafter, the result is inverse linearly transformed from (τ-p) space to the (t-y) domain and in quadratic form from (τ-q) space to the (t-x) domain for display as a signal gather S(t,x,y). The display is representative of the structure of the subsurface earth layers cleared of multiple reflections and other unwanted noises. The previously-removed hyperbolic moveout may be added back to the clarified gathers for further processing of any desired type.

This invention has been described with a certain degree of specificity by way of example but not by way of limitation. Those skilled in the art will devise obvious variations to the examples given herein but which will fall within the scope of this invention which is limited only by the appended claims.

What is claimed is:

1. A method comprising:
    providing a data set of consecutive CMP seismic-data-signal gathers having a predetermined geometry, the signals being discretely recorded in t-x space and corrected for hyperbolic moveout;
    executing a parabolic Radon transformation, embracing a predetermined moveout window, of said data set in the x direction and executing a linear Radon transformation encompassing a predetermined dip window in the y direction to form a forward-transformed Radon gather, D(τ,p,q);
    transforming D(τ,p,q) from the (τ-p-q) domain to the frequency domain to define the spectral data response, $D(f,k_p,k_q)$;

defining the spectral geometry response, $G(f,k_p,k_q)$ for a zero-dip, zero-moveout model built with the geometry characteristic of the data set;

multiplying $D(f,k_p,k_q)$ by $|1/G(f,k_p,k_q)|$ and inversely transforming the product from the frequency domain to the ($\tau$-p-q) domain as a sharpened Radon gathers ($\tau$,p,q);

scavenging undesired noise from $s(\tau,p,q)$ and inverse-transforming the residue to the t-x-y domain to recover a substantially noise-free, unaliased data set $S(t,x,y)$.

2. The method as defined by claim 1, comprising:

prior to the step of multiplication, establishing a preferred threshold value $\epsilon$ for the zero-dip, zero-moveout normalizing function $|G(f,k_p,k_q)|$;

multiplying $D(f,k_p,k_q)$ by $1/\epsilon$ when $|G(f,k_p,k_q)|<\epsilon$ but by $|1/G(f,k_p,k_q)|$ otherwise.

3. A method for processing seismic data sets that have been sparsely sampled in t-x-y space, comprising:

providing a data set of consecutive CMP seismic-data-signal gathers having a predetermined geometry and distributed across t-y space, the signals being discretely recorded in t-x space within each said CMP and corrected for hyperbolic normal moveout;

executing a parabolic Radon transformation, embracing a predetermined moveout window, of said data set in the x direction and executing a linear Radon transformation encompassing a predetermined dip window in the y direction to form a forward-transformed Radon gather, $D(\tau,p,q)$;

transforming $D(\tau,p,q)$ from the tau-p-q domain to the three-dimensional frequency domain to define the spectral data response function, $D(f,k_p,k_q)$;

defining a zero-dip normalizing function, $|G(f,k_p,k_q)|$ for a flat-lying symmetric model built with the geometry characteristic of the data set;

establishing a threshold value, $\epsilon$, for the zero-dip normalizing function;

multiplying $|D(f,k_p,k_q)|$ by $1/\epsilon$ when $|G(f,k_p,k_q)|<\epsilon$ but by $|1/G(f,k_p,k_q)|$ otherwise, and inversely transforming the product from the frequency (f-$k_p$-$k_q$) domain to the ($\tau$-p-q) domain as an improved-resolution Radon gather $s(\tau,p,q)$ gather;

scavenging undesired noise from $s(\tau,p,q)$ and inversely transforming the residue to the t-x-y domain to recover a substantially noise free, unaliased data set $S(t,x,y)$; and processing the noise-free, unaliased data set to provide a model of subsurface earth layers.

4. The method as defined by claim 1 wherein:

$\epsilon = 0.01 \, [\max \{|G(f,k_p,k_q)|\}]$.

5. The method as defined by claim 3, wherein:

$\epsilon = 0.01 \, [\max \{|G(f,k_p,k_q)|\}]$.

* * * * *